Aug. 2, 1949.                J. REDINGTON                2,478,055
                              LOADING APPARATUS
Filed June 15, 1946                                    2 Sheets-Sheet 1

INVENTOR
JOHN. REDINGTON
BY Featherstonhaugh & Co.
ATTORNEYS

Aug. 2, 1949.　　　　J. REDINGTON　　　2,478,055
LOADING APPARATUS
Filed June 15, 1946　　　　　　　　2 Sheets-Sheet 2

INVENTOR
JOHN. REDINGTON
BY Fetherstonhaugh & Co.
ATTORNEYS

Patented Aug. 2, 1949

2,478,055

UNITED STATES PATENT OFFICE 2,478,055

LOADING APPARATUS

John Redington, Schumacher, Ontario, Canada

Application June 15, 1946, Serial No. 676,923

11 Claims. (Cl. 214—132)

This invention relates to a car loading apparatus of the mechanically actuated shovel type adapted for use in mines, tunnels and other places where low ceilings and limited working space requires a compact car loading apparatus.

A particular object of this invention is to provide a simplified shovel actuating mechanism for swinging the shovel from a digging position to an overhead dumping position, and vice versa. The mechanism consists of a frame structure provided with rearwardly and downwardly extending guide rails secured to the side walls thereof, a pair of controlling arms having one end mounted on the frame structure to rotate upwardly and rearwardly about a fixed horizontal axis, a shovel carrying assembly having a shovel secured to the lower end thereof and guide rail engaging means carried by the upper end thereof adapted to travel in said guide rails and means for moving said guide rail engaging means in said guide rails. The shovel carrying assembly is pivotally connected at a suitably point intermediate the ends of said assembly to the free ends of the controlling arms whereby the shovel is caused to swing from its digging position upwardly and rearwardly to its inverted dumping position about its pivotal connection to said controlling arms while the latter are rotated upwardly and rearwardly about the fixed horizontal axis when the upper end of said carrying assembly is moved rearwardly and downwardly along the predetermined path of the guide rails.

A further object of this invention is to provide a cable chain or other suitable means for moving the upper end of the shovel carrying assembly along the guide rails, said cable chain being attached to a reversible actuating mechanism carried by the frame structure for controlling movement of the shovel to and from its dumping position. Although I presently prefer to use an air operated actuating mechanism, it is to be understood that any suitable actuating mechanism within the scope of this invention may be employed for this purpose.

A still further object is to provide shock absorbing bumper means carried by the floor of said frame structure and positioned adjacent the base of the guide rails which are adapted to take up the shock of the shovel carrying assembly when it moves into its dumping position and also to facilitate the return movement of the empty shovel by imparting its initial momentum. In the preferred embodiment of this invention, I have shown a pair of shock absorbing compression springs mounted on abutments at the lower end of the guide rails. However, any suitable shock absorbing means may be provided in lieu thereof.

Other objects, features and characteristic advantages of my invention will be more readily appreciated from the following detailed description taken in connection with the accompanying drawings, in which—

Figure 1:
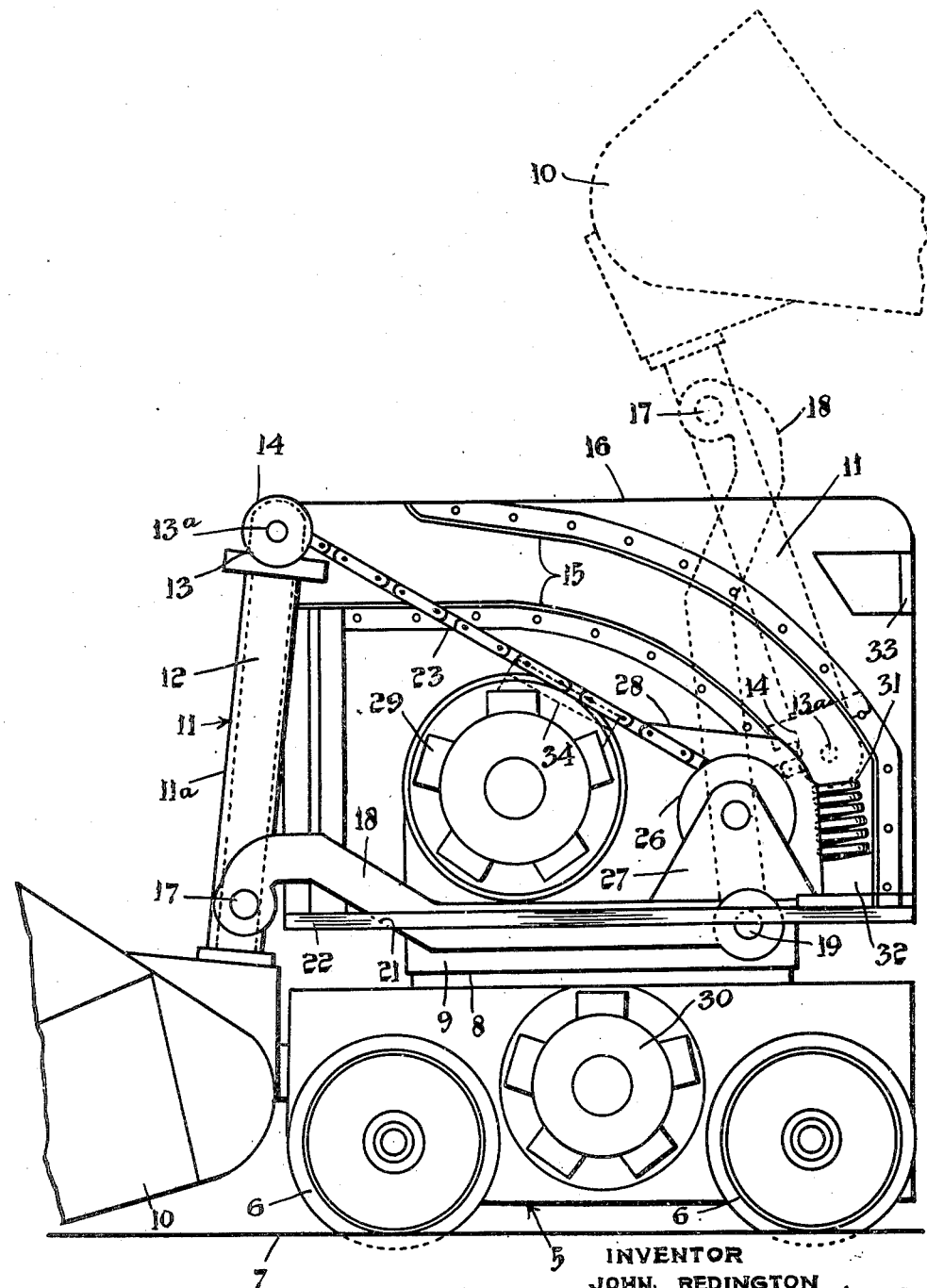
Fig. 1 is a side view of my invention, with a side wall of the frame structure removed to disclose the working parts of my shovel actuating mechanism.
Figure 2:
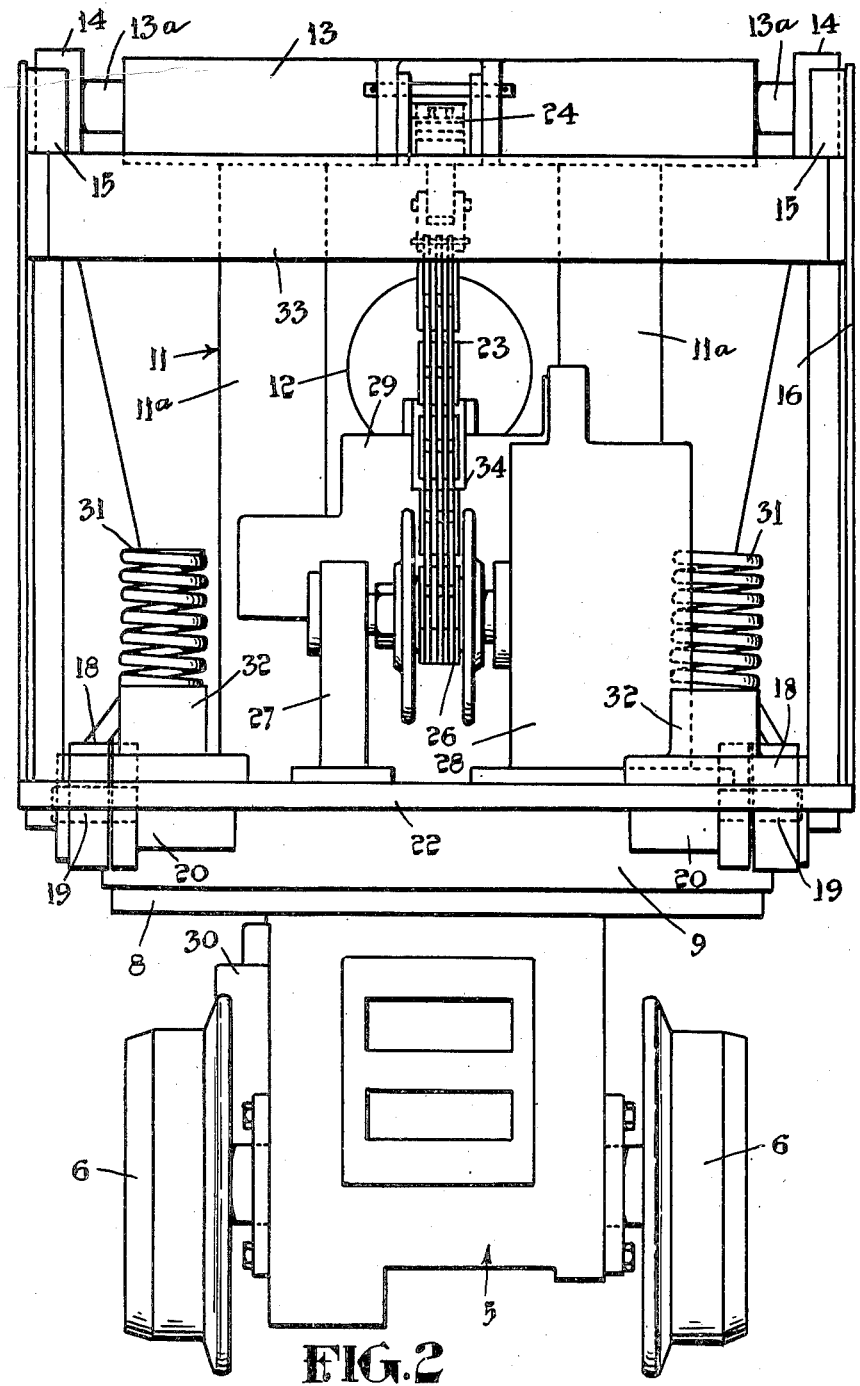
Fig. 2 is a rear end view (enlarged) of my car loading apparatus.

Referring more particularly to the drawings, 5 designates a truck equipped with wheels 6 arranged to run on tracks 7. A turn-table 8 is mounted on truck 5 and carries a frame structure 9 in which the component elements of my improved mine car shovel actuating mechanism are arranged.

According to the preferred embodiment of my invention a scoop or shovel member 10 is rigidly attached to the lower end of a shovel carrying assembly 11 comprising a pair of shovel sticks 11a rigidly secured to the side edges of a frame 12 arranged therebetween. A cross-head 13 is arranged at the top of frame 12 between the upper ends of the shovel sticks and is provided with transversely extending trunnions 13a on which rollers 14 are arranged to travel in curved guide rails 15 carried by side walls 16 of the frame structure 9. The intermediate portion of the shovel carrying assembly is provided with transversely extending trunnions 17 to which a pair of controlling arms 18 have their front ends pivotally connected. The rear ends of said controlling arms are pivotally mounted on a pair of transversely extending trunnions 19 carried by brackets 20 welded or otherwise secured to the under side of frame structure 9. The arms 18 are normally disposed in a horizontal position with portions of their length accommodated in a slot 21 provided in the floor 22 of the frame structure with the forward position of said arms in abutting engagement with said floor when the shovel is in its digging position as shown in full line in Fig. 1.

A cable chain 23 has one end secured to a cable chain attachment 24 carried by cross-head 13 of the shovel carrying assembly and the other end arranged to wind about a hoisting drum 26. Drum 26 has one end journalled in a bearing standard 27 and the other end journalled in a gear housing 28, said standard and said housing being carried by floor 22. A reversible motor 29 is carried by said housing and is geared to operate drum 26.

During the digging operation the shovel actuating mechanism is arranged, as shown by the full lines in Fig. 1, the shovel carrying assembly 11 being disposed in a substantially vertical position with the controlling arms extending horizontally and having their forward portions in abuttting engagement with floor 22 and cable chain 23 fully extended. A truck driving motor 30, geared to drive the wheels 6, facilitates the scooping of shovel 10. When the shovel is filled, motor 29 causes the hoisting drum 26 to wind cable chain 23, pulling the cross-head 13. The rollers 14, travelling in guide rails 15, cause the upper end of the shovel carrying assembly 11 to be guided rearwardly and downwardly. At the same time, the shovel carrying assembly is swung from its digging to its inverted dumping position about its pivotal trunnion connections 17 to the forward ends of controlling arms 18, the latter being caused to travel upwardly and rearwardly about their pivotal connections to the trunnions 19 by the rearward pull on the shovel carrying assembly. This rearward movement of the parts continues until the shovel 10 and shovel carrying assembly 11 are disposed in the inverted dumping position as indicated by dotted lines in Fig. 1. The jack-knife folding action of the shovel carrying assembly with the controlling arms causes the shovel to move from its digging position rearwardly and upwardly to the dumping position, maintaining a minimum of height throughout the cycle. Due to the low point of the fulcrum of the shovel carrying assembly on the forward end of the controlling arms, the digging action is very great and eliminates any tendency of the rear truck wheels to lift clear of the tracks. Thus the forward traction of the entire machine is maintained at a maximum.

Before the shovel carrying assembly can reach a vertical position in its dumping action, the cross head 13 strikes against shock absorbing compression springs 31 mounted on abutments 32 located on floor 22 at the lower rear end of rails 15. This positioning of the springs eliminates any racking and loosening of the side walls 16 which is a common source of trouble in the usual device where the springs are carried by a member which is fastened to the side walls. A bar 33 extends across the rear of the frame structure and is fastened to the ends of the side walls 16. This bar acts as a further stop member to prevent the shovel in its dumping action from reaching its vertical point of balance. The shock of striking springs 31 throws the load from the shovel and the compression springs then impart the initial reversing mometum to the empty shovel. The hoisting drum 26 is reversed simultaneously as the cross head 13 contacts springs 31 to allow controlled return of the shovel to its digging position through reverse throttle control of motor 29.

To prevent any wear or damage to the motor 29 due to slackness in the cable chain, a channel member 34 is positioned between said motor and cable chain 23. The channel member is provided with a felt pad saturated with oil which the cable chain picks up for its own lubrication.

I claim:

1. A mine car loading apparatus of the mechanically actuated shovel type comprising a frame structure, rearwardly and downwardly extending guide rail members secured to the side walls of said frame structure, a pair of controlling arms having one end mounted on the frame structure to rotate upwardly and rearwardly about a fixed horizontal axis, a shovel carrier, a shovel rigidly secured to the lower end of said carrier and guide rail engaging means carried by the upper end of said carrier and adapted to travel in said guide rails, said shovel carrier being pivotally connected at a suitable point intermediate the ends of said carrier to the free ends of the controlling arms, and actuating means secured to the upper end of said shovel carrier for moving the guide rail engaging means along the predetermined path of said guide rails.

2. A mine car loading apparatus as set forth in claim 1, in which said actuating means comprises a hoist drum carried by said frame structure, an air motor geared to said hoist drum and a flexible member having one end secured to the upper end of said shovel carrier and the other end arranged to be wound around said hoist drum.

3. A mine car loading appartus as set forth in claim 1, in which said actuating means comprises a hoist drum carried by said frame structure, a cable chain having one end secured to the upper end of said shovel carrier and the other end arranged to cooperate with said hoist drum, and a reversible motor geared to said hoist drum whereby said cable chain may be wound or unwound on said drum under control for moving said shovel carrier and shovel from the digging to dumping position and vice versa.

4. A mine car loading apparatus as set forth in claim 1, including recoil shock absorbing bumper means carried by the floor of said frame structure engageable with the upper ends of said shovel carrier for limiting the length of travel of said carrier, the recoil of said bumper means serving to return the said carrier and shovel to the digging position.

5. A mine car loading apparatus as set forth in claim 1, including a pair of shock absorbing compression springs mounted on abutments at the lower end of the guide rails, said springs being engageable with the upper end of said shovel carrier for limting the length of travel of said carrier and shovel to the dumping position and being adapted to initiate return movement of said carrier and shovel to the digging position.

6. A mine car loading apparatus of the mechanically actuated shovel type comprising a frame structure, stationary guide rail members arranged along the side walls of said frame structure to extend rearwardly a predetermined distance and a curve downwardly along a fixed path, a pair of controlling arms having one end mounted on the frame structure to rotate upwardly and rearwardly about a fixed horizontal axis, a shovel carrier, a shovel secured to the lower end thereof and guide rail engaging means mounted on the upper end of said carrier and adapted to travel in said guide rails, said shovel carrier being pivotally connected at a suitable point intermediate the ends of the assembly to the free ends of said controlling arms, and actuating means secured to the upper end of said shovel carrier for moving the guide rail engaging means along said predetermined path of the guide rails whereby the said upper end of the shovel carrier being moved rearwardly a predetermined distance and downwardly along a fixed path rotates said controlling arms about their fixed horizontal axis and thereby causing the shovel carrier and shovel to rotate about the pivotal connection to the free ends of said controlling arms from its digging position to its inverted dumping position and means for returning said shovel carrier and shovel to the digging position through reverse movement.

7. A mine car loading apparatus of the mechanically actuated shovel type comprising a frame structure, stationary rigid guide rail members mounted over said frame structure to extend from the forward end of said structure rearwardly and downwardly whereby the lower rear end of said rails are terminated adjacent the rear end of said frame structure, a pair of controlling arms having one end mounted on the frame structure to rotate upwardly and rearwardly about a fixed horizontal axis, a shovel carrier, a shovel rigidly secured to the lower end of said carrier and guide rail engaging means carried by the upper end of said carrier and adapted to travel in said guide rails, said shovel carrier being pivotally connected at a suitable point intermediate the ends of said carrier to the free ends of the controlling arms, and actuating means secured to the upper end of said shovel carrier for moving the guide rail engaging means along the predetermined path of said guide rails.

8. A mine car loading apparatus of the mechanically actuated shovel type comprising a base, side members rising from said base and provided with guide rails extending upwardly and forwardly from the rear portion of the base, a pair of controlling arms pivoted to the base to swing about a fixed axis located adjacent and forwardly of said guide rails, a shovel carrier intermediately pivoted to the forward ends of said controlling arms, a shovel rigidly secured to the shovel carrier below the pivotal connection between the shovel carrier and said controlling arms, track engaging means at the upper end of the shovel carrier adapted to travel from the rear to the front ends of the tracks during the shifting of the shovel to a loading position, and from the front to the rear ends of the tracks during shifting of the shovel to an unloading position, and shovel shifting means connected to the shovel carrier and operable to pull the track engaging means of the shovel carrier rearwardly along said tracks to thereby cause the control arms to swing upwardly and rearwardly about their fixed pivotal axis and to cause an accompanying swinging movement of the shovel carrier about its pivotal connections to the control arms whereby the shovel carrier is gradually inverted to dispose the shovel in a dumping position as the track engaging means of the shovel carrier approach the rear ends of the tracks.

9. A mine car loading apparatus as set forth in claim 8 including means operable in the dumping position of said shovel to initiate the forward return movement of the shovel carrier whereby the shovel carrier and shovel are returned to the loading position.

10. A mine car loading apparatus as set forth in claim 8 including resilient compressible means operable in the dumping position of said shovel to initiate the forward return movement of the shovel carrier whereby the shovel carrier and shovel are restored to the loading position.

11. A mine car loading apparatus as set forth in claim 8 in which said shovel shifting means includes a flexible member secured to the upper end of said shovel carrier and a power actuated hoist drum about which said flexible member is arranged to be wound around to pull the track engaging means of the shovel carrier rearwardly along said tracks.

JOHN REDINGTON.

REFERENCES CITED

The following references are of record in the file of this patent:

UNITED STATES PATENTS

| Number | Name | Date |
|---|---|---|
| 1,186,617 | Talboys | June 13, 1916 |
| 1,444,056 | Billings et al. | Feb. 6, 1923 |
| 1,915,485 | Brussolo | June 27, 1933 |
| 2,077,159 | Stoltz | Apr. 13, 1937 |
| 2,230,755 | Littleton | Feb. 4, 1941 |
| 2,334,835 | Nix | Nov. 23, 1943 |
| 2,398,859 | Ruddock | Apr. 23, 1946 |